(12) United States Patent
Lemoine et al.

(10) Patent No.: US 10,744,570 B2
(45) Date of Patent: Aug. 18, 2020

(54) BORING BAR ACTUATABLE BY A CENTRIFUGAL FORCE

(71) Applicant: SANDVIK INTELLECTUAL PROPERTY AB, Sandviken (SE)

(72) Inventors: Vincent Lemoine, Doe (FR); Philippe Andre, Amboise (FR); Jacques Gasthuys, Saint Jean de Braye (FR); Joly Damien, Saint Avertin (FR); David Bonhoure, Lyunes (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/069,044

(22) PCT Filed: Jan. 9, 2017

(86) PCT No.: PCT/EP2017/050320
§ 371 (c)(1),
(2) Date: Jul. 10, 2018

(87) PCT Pub. No.: WO2017/125271
PCT Pub. Date: Jul. 27, 2017

(65) Prior Publication Data
US 2019/0022765 A1    Jan. 24, 2019

(30) Foreign Application Priority Data

Jan. 18, 2016 (EP) .................................... 16305045

(51) Int. Cl.
*B23B 29/02* (2006.01)
*B23B 29/034* (2006.01)

(52) U.S. Cl.
CPC .. *B23B 29/03446* (2013.01); *B23B 29/03457* (2013.01); *B23B 2270/025* (2013.01); *B23B 2270/04* (2013.01); *B23B 2270/24* (2013.01)

(58) Field of Classification Search
CPC ........ B23B 29/03446; B23B 29/03457; B23B 2270/025; B23B 2270/04; B23B 2270/24
See application file for complete search history.

(56) References Cited

U.S. PATENT DOCUMENTS 6,394,710 B1    5/2002 Kurz
2014/0328639 A1    11/2014 Hofmann

FOREIGN PATENT DOCUMENTS

DE    4125106 A1    2/1993
EP    1123766 A1    8/2001

*Primary Examiner* — Sunil K Singh
*Assistant Examiner* — Paul M Janeski
(74) *Attorney, Agent, or Firm* — Corinne R. Gorski (57) ABSTRACT

An actuatable boring bar is configured to place a cutting insert cartridge received onto the boring bar in a cutting position when the centrifugal force generated by the rotation of the boring bar about the rotation axis reaches a centrifugal force threshold and in a non-cutting position when the centrifugal force generated by the rotation of the boring bar about the rotation axis is below the centrifugal force threshold. The boring bar is further configured so that the cutting insert cartridge can be set-up onto the boring bar in the cutting position.

14 Claims, 3 Drawing Sheets

BORING BAR ACTUATABLE BY A CENTRIFUGAL FORCE

RELATED APPLICATION DATA

This application is a § 371 National Stage Application of PCT International Application No. PCT/EP2017/050320 filed Jan. 9, 2017 claiming priority to EP 16305045.3 filed Jan. 18, 2016.

TECHNICAL FIELD

The present disclosure relates to an actuatable boring bar configured to place a cutting insert cartridge received onto the boring bar in a cutting position when the centrifugal force generated by the rotation of the boring bar about the rotation axis reaches a centrifugal force threshold and in a non-cutting position when the centrifugal force generated by the rotation of the boring bar about the rotation axis is below the centrifugal force threshold, the boring bar being further configured so that the cutting insert cartridge can be set-up onto the boring bar in the cutting position.

BACKGROUND

It is known in the art to use a boring bar actuatable by the centrifugal force to selectively place a cutting insert cartridge mounted onto the boring bar in either a non-cutting position or a cutting position. Particularly, when the boring bar is rotated, the cutting insert cartridge moves from the non-cutting position to the cutting position. Conversely, when the boring bar is stopped, the cutting insert cartridge moves from the cutting-position to the non-cutting position.

However, these known boring bars do not allow the cutting insert to be set-up on the boring bar with a sufficient accuracy, leading the boring bar to be unable to perform machining with high-precision requirements.

SUMMARY OF THE DISCLOSURE

An aspect of the present disclosure is to provide a boring bar, which will solve and/or reduce the problems mentioned above.

The present disclosure therefore relates to a boring bar actuatable by a centrifugal force generated by rotation of the boring bar about a rotation axis, comprising:
  a coupling portion to couple the boring bar to a spindle for rotating the boring bar about the rotation axis, the coupling portion comprising a supply inlet for connecting the boring bar to a fluid supplying circuit;
  a receiving portion to receive a cutting insert cartridge in a cutting position or a non-cutting position;
  an actuating device configured to place the cutting insert cartridge received in the receiving portion either in the cutting position or in the non-cutting position, the actuating device having an actuating inlet and a non-actuating inlet, the actuating device being configured to place the cutting insert cartridge:
    in the non-cutting position when the actuating inlet is supplied with a fluid, and
    in the cutting position when the non-actuating inlet is supplied with a fluid or when neither the actuating or the non-actuating inlet is supplied with a fluid;
  a fluid connecting circuit for fluid connection between the supply inlet and either the actuating inlet or the non-actuating inlet, the fluid connecting circuit comprising a control element movable between:
    a first control position wherein the supply inlet is in fluid connection with the actuating inlet, and
    a second control position in which the supply inlet is in fluid connection with the non-actuating inlet;
  wherein the control element is configured to be moved from the first control position to the second control position when the centrifugal force generated by the rotation of the boring bar about the rotation axis reaches a centrifugal force threshold, the control element being configured to be moved from the second control position to the first control position when the centrifugal force generated by the rotation of the boring bar about the rotation axis is below the centrifugal force threshold.

With a boring bar actuatable by a centrifugal force generated by rotation of the boring bar, the actuation of the boring bar is facilitated with respect to a boring bar in which the actuation is controlled by the pressure of a fluid supplied to the boring bar or by a mechanical system external to the boring bar. Indeed, the cutting insert cartridge can be selectively and automatically place in either the cutting or the non-cutting position depending on the rotation of the boring bar. No additional controller is needed for actuating the boring bar.

Furthermore, when the boring bar is not supplied with a fluid, the boring bar is configured to place the cutting insert cartridge in the cutting position, regardless of the rotation of the boring bar about the rotation axis. Hence, the cutting insert mounted onto the cutting insert cartridge can be set-up directly in the cutting position so that the set-up can be performed accurately. Particularly, a set-up of the cutting insert when the cutting insert cartridge is in the cutting position allows the set-up to be more accurate than a set-up performed when a cutting insert cartridge is in the non-cutting position. Furthermore, setting-up the cutting insert in a cutting position of the cutting cartridge allows avoiding the use of a special set-up device.

According to one embodiment, the fluid connecting circuit further comprises a control chamber formed within the boring bar, the control chamber being in fluid connection, at a first side wall, with the supply inlet and, at a second side wall opposite to the first side wall, with the actuating inlet and the non-actuating inlet, the control element being disposed within the control chamber.

According to another embodiment, the control chamber extends transversally to the rotation axis of the boring bar, the first and second side walls extending along the control chamber, the actuating and the non-actuating inlets being formed in the second side wall, the non-actuating inlet being formed in the second side wall at a greater radial distance from the rotation axis than the actuating inlet, wherein the second control position of the control element being at a greater radial distance from the rotation axis than the first control position.

According to another embodiment, the fluid connecting circuit further comprises a resilient control return element disposed within the control chamber between the control element and an end wall of the control chamber, the resilient control return element being at a greater radial distance from the rotation axis than the control element for exerting a return force onto the control element so as to force the control element to remain in the first control position, wherein a maximum return force of the resilient control return element is predetermined as being lower than the centrifugal force threshold.

According to another embodiment, the actuating device comprises:

an actuating chamber formed within the boring bar;

a piston configured to translate in the actuating chamber between a first and a second end positions, the piston defining an inlet portion of the chamber in fluid connection with the actuating inlet, the piston being configured to be translated from the first end position to the second end position when the pressure inside the inlet portion reaches a pressure threshold;

an actuating resilient return element for translating the piston from the second end position to the first end position when the pressure inside the inlet portion is below the pressure threshold;

wherein the actuating device is configured to place the cutting insert cartridge:
 in the non-cutting position when the piston is in the second end position, and
 in the cutting position when the piston is in the first end position.

According to another embodiment, the actuating chamber extends along the rotation axis of the boring bar, the actuating device comprising an interface element translatable transversally to the rotation axis, the interface element having a first surface for contacting the cutting insert cartridge and a second surface for contacting an actuating surface of the piston, the second surface and the actuating surface being complementary biased with respect to the rotation axis so that, when the piston is translated along the rotation axis, the interface element and the cutting insert cartridge translates transversally to the rotation axis.

According to another embodiment, the fluid connection circuit further comprises a leakage channel extending from the control chamber to a leakage outlet formed at an outer wall of the boring bar, the leakage channel being closed by the control element when the control element is in the first control position, the leakage channel being in fluid connection with the actuating inlet when the control element is in the second control position.

According to another embodiment, the non-actuating inlet is in fluid connection with a lubrication orifice formed in the receiving portion to discharge the fluid on a cutting insert mounted onto the cutting insert cartridge.

Therefore, the fluid is used for both the actuation of the boring bar and the lubrication of the cutting insert cartridge so that the boring bar 10 is simplified According to another embodiment, the boring bar comprises at least two receiving portions to receive a plurality of cutting insert cartridges distributed on the boring bar about the rotation axis, a lubrication orifice being formed in each receiving portion, the non-actuating inlet being in fluid connection with each lubrication orifice to discharge the fluid on a cutting insert mounted on each cutting insert cartridge received in the receiving portions.

According to another embodiment, the non-actuating inlet comprises a circular groove, the actuating device further comprising a plurality of lubrication channels, each lubrication channel extending from the circular groove to a lubrication orifice formed in a receiving portion.

According to another embodiment, the boring bar comprises:
 a tool holder comprising the coupling portion, the control element, a first portion of the non-actuating inlet and a first portion of the actuating inlet; and
 a tool body comprising the receiving portion and a second portion of the non-actuating inlet and a second portion of the actuating inlet;
 wherein the tool holder and the tool body are configured to be assembled together.

Providing the boring bar with two parts assembled together allows to facilitate the machining of the boring bar by improving the accessibility to the fluid connecting circuit and the actuating device. Particularly, this facilitates machining of the actuating and non-actuating inlets.

The present disclosure also relates to a method for preparing a boring bar actuatable by a centrifugal force generated by rotation of the boring bar about a rotation axis for placing a cutting insert cartridge mounted onto the boring bar in a cutting or a non-cutting position, the method comprising the steps of:
 selecting a centrifugal force threshold;
 placing the boring bar in a non-actuating position to allow a cutting insert cartridge to be mounted in a cutting position onto the boring bar;
 setting-up a cutting insert cartridge in a cutting position onto the boring bar;
 mounting a coupling portion of the boring bar in a spindle configured to rotate the boring bar about the rotation axis; and
 supplying the boring bar with a fluid;
 actuating the boring bar to place the cutting insert cartridge in the non-cutting position by rotating the boring bar about the rotation axis so that the centrifugal force generated by the rotation of the boring bar about the rotation axis is below the centrifugal force threshold.

According to another embodiment, the method further comprises a forward direction machining sequence comprising the steps of:
 rotating the spindle to rotate the boring bar about the rotation axis at a rotation speed generating a centrifugal force equal or higher than the centrifugal force threshold to place the cutting insert cartridge in the cutting position;
 translating the boring bar in a forward direction with respect to the workpiece to remove material from the bore;
 rotating the spindle to rotate the boring bar about the rotation axis at a rotation speed generating a centrifugal force lower than the centrifugal force threshold to place the cutting insert cartridge in the non-cutting position;
 translating the boring bar in a backward direction with respect to the workpiece to remove the boring bar from the bore.

According to another embodiment, the method further comprises a backward direction machining sequence comprising the steps of:
 translating the boring bar in the forward direction with respect to the workpiece without contact between the workpiece and a cutting insert mounted onto the cutting insert cartridge;
 rotating the spindle to rotate the boring bar about the rotation axis at a rotation speed generating a centrifugal force equal or higher than the centrifugal force threshold to place the cutting insert cartridge in the cutting position;
 translating the boring bar in the backward direction with respect to the workpiece to remove material from the bore;
 rotating the spindle to rotate the boring bar about the rotation axis at a rotation speed generating a centrifugal force lower than the centrifugal force threshold to place the cutting insert cartridge in the non-cutting position.

According to another embodiment, the method further comprises at least one sequence of forward direction machining as mentioned above and at least one sequence of backward direction machining as mentioned above.

Further features and advantages of the present disclosure will become apparent from the following detailed description of embodiments, given as non-limiting examples, with reference to the accompanying drawings listed hereunder.

DETAILED DESCRIPTION

Figure 1:
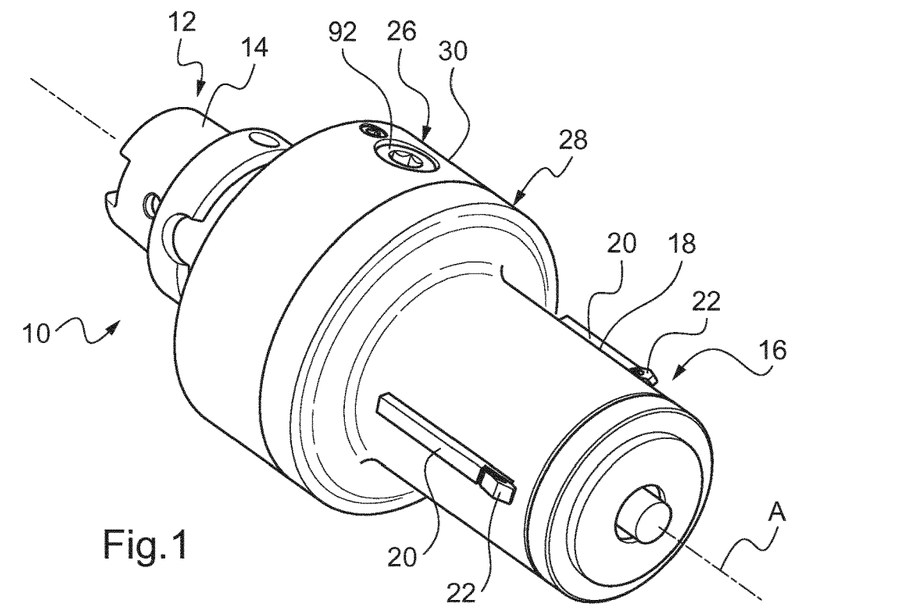
FIG. 1 shows schematically a perspective view of a boring bar comprising a tool holder and a tool body assembled together.

FIG. 1 shows a boring bar 10 comprising a tool holder 26 and a tool body 28 assembled together at an assembling interface 30. The boring bar 10 extends along a rotation axis A. The tool holder 26 comprises, at a first end 12 of the boring bar 10, a coupling portion 14 to be coupled to a spindle (not shown) for rotation of the boring bar 10 about the rotation axis A. At a second end 16 of the boring bar 10, opposite to the first end 12, the tool body 28 comprises three receiving portions 18 to receive a cutting insert cartridge 20 in each of the three receiving portions 18. The receiving portions 18 are distributed on the boring bar 10 about the rotation axis A. The cutting insert cartridges 20 comprises a cutting insert 22 to remove material from a bore to be machined.

The boring bar 10 may be at a steady state wherein the boring bar 10 is not supplied with a fluid and at an operating state wherein the boring bar 10 is supplied with the fluid.

When the boring bar 10 is at the operating state, the boring bar 10 is actuatable by a centrifugal force generated by rotation of the boring bar 10 about the rotation axis A to place selectively the cutting insert cartridges 20 in either a cutting position or a non-cutting position. Since the centrifugal force generated by the rotation of the boring bar 10 about the rotation axis A is function of the rotation speed of the boring bar 10, the actuation of the boring bar 10 can be controlled by varying the rotation speed of the boring bar 10. Hence, the actuation of the boring bar 10 is facilitated with respect to a boring bar in which the actuation is controlled by the pressure of a fluid supplied to the boring bar or by a mechanical system external to the boring bar.

When the boring bar 10 is at the steady state, the boring bar 10 is configured to place the cutting insert cartridge in the cutting position, regardless of the rotation of the boring bar 10 about the rotation axis A. Hence, the cutting insert 22 mounted onto the cutting insert cartridge 20 can be set-up directly in the cutting position so that the set-up can be performed accurately. Particularly, a set-up of the cutting insert 22 when the cutting insert cartridge 20 is in the cutting position allows the set-up to be more accurate than a set-up performed when a cutting insert cartridge is in the non-cutting position. Furthermore, setting-up the cutting insert 22 in a cutting position of the cutting cartridge 20 allows avoiding the use of a special set-up device.

According to the present disclosure, the "cutting position" and the "non-cutting position" refer to radial positions of the cutting insert cartridges 20 with respect to the rotation axis A of the boring bar 10, i.e. along a control axis B perpendicular to the rotation axis A. Particularly, the cutting position of the cutting insert cartridges 20 is at a greater radial distance from the rotation axis A than the non-cutting position. The "cutting position" refers to a position wherein the cutting insert mounted thereof thereon is able to remove material from a bore to obtain a pre-determined dimension of the bore. The "non-cutting" position refers to a position of the cutting insert cartridges 20 wherein the boring bar 10 can translate along the bore to be machined without contact between the bore and the cutting inserts mounted onto the cutting insert cartridges 20.

Alternatively, the cutting and non-cutting positions may also be called as a working and a non-working positions, i.e. allowing to machine a workpiece with the boring bar 10 or not.

Hence, according to the actuation state of the boring bar 10, i.e. actuated or non-actuated, the boring bar 10 can be translated along a bore to be machined either for removing material from the bore or without contact between the workpiece and the cutting insert 22 mounted onto the cutting insert cartridge 20.

Figure 2:
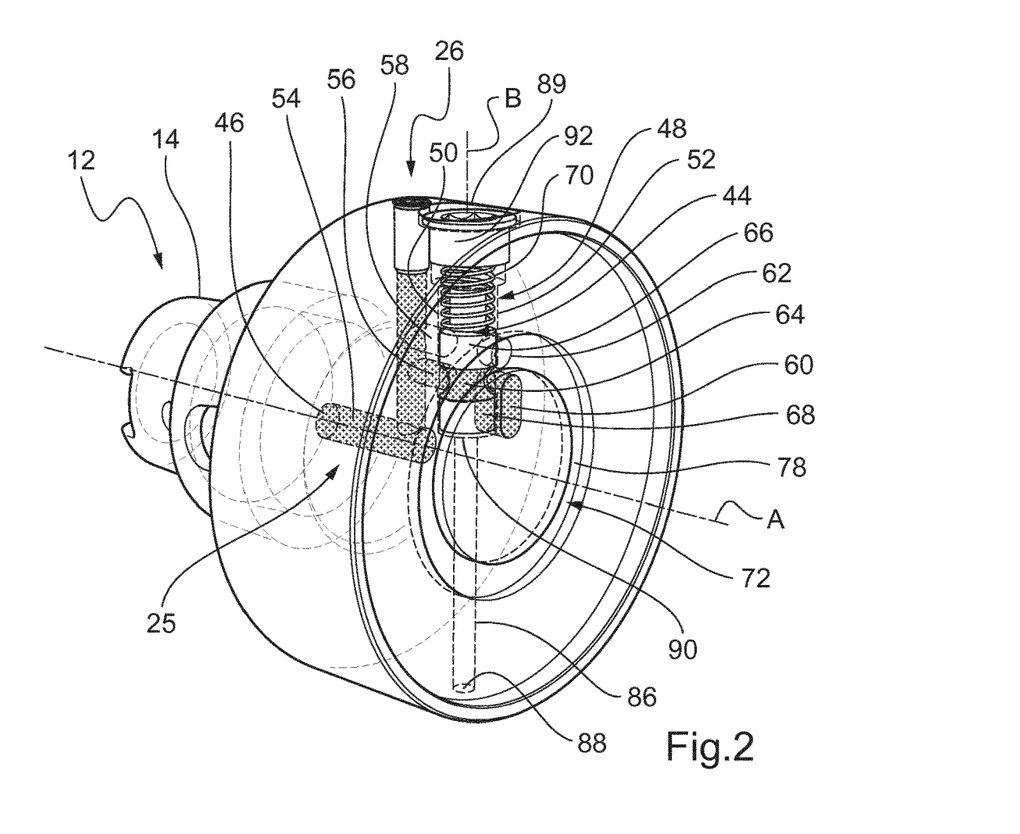
FIGS. 2 and 3 show schematically a perspective view of the tool holder with a control element respectively in a first and a second control positions.

As shown on FIG. 2, the boring bar 10 comprises a supply inlet 46 for connecting the boring bar 10 to an external fluid supplying circuit (not shown). The external fluid supplying circuit may be integrated to the spindle or external to the spindle to supply the fluid independently from the spindle. The fluid supplied to the boring bar 10 is for example a liquid, such as a coolant, or a gas, such as air. When the fluid is a coolant, the fluid may be usefully used for both the actuation of the boring bar 10 and the lubrication of the cutting insert cartridge 20. Hence, using a coolant as the fluid supplied to the boring bar 10 simplifies the boring bar 10 by gathering the actuation and the lubrication functions.

For allowing the boring bar 10 to place the cutting insert cartridges 20 in either the cutting position or the non-cutting position, the boring bar 10 comprises an actuating device 24 and a fluid connecting circuit 25 for controlling the actuating device 24. The fluid connecting circuit 25 is in fluid connection with the external fluid supplying circuit.

When the boring bar 10 is at the operating state, the boring bar 10 is configured to place the cutting insert cartridge 20 in the cutting position when the centrifugal force generated by the rotation of the boring bar 10 about the rotation axis A reaches the centrifugal force threshold. Conversely, the boring bar 10 is also configured, when the boring bar 10 is at the operating state, to place the cutting insert cartridge 20 in the non-cutting position when the centrifugal force generated by the rotation of the boring bar 10 about the rotation axis A is below the centrifugal force threshold.

Furthermore, as mentioned above, the boring bar 10 at the steady state allows the cutting insert cartridge 20 to be in the cutting position regardless of the rotation of the boring bar 10. As a consequence, the cutting insert cartridge 20 remains in the cutting position regardless the centrifugal force generated by the rotation of the boring bar 10 about the rotation axis A when the boring bar 10 is at the steady state.

For controlling the actuating device 24, the fluid connecting circuit 25 comprises a control chamber 48 formed within the tool holder 26 and a control element 44 translatable within the control chamber 48. The translatable control element 44 may also be called as a slider. The control chamber 48 extends radially to the rotation axis A, the control element 44 translating along the control chamber 48. The control chamber 48 comprises a first side wall 50 and a second side wall 52, both extending radially to the rotation axis A. The second side wall 52 is opposite to the first side wall 50 with respect to the radial extension axis B of the control chamber 48. The control chamber 48 is cylindrical with a circular cross-section so that the first 50 and the second 52 side walls refer to two half-cylinder walls of the control chamber 48 facing each other. Particularly, when the tool holder 26 and the tool body 28 are assembled together, the first side wall 50 faces the second end 16 and the second side wall 52 faces the first end 12 of the boring bar 10.

For connecting the control chamber 48 to the external fluid supplying circuit, the fluid connecting circuit 25 comprises a fluid entering channel 54 formed between the supply inlet 46 and the control chamber 48. Particularly, the fluid entering channel 54 comprises a first 56 and a second 58 channel portions, each being in fluid connection with the control chamber 48 at the first side wall 50. The second channel portion 58 is formed at a greater radial distance from the rotation axis A than the first channel portion 56. Hence, when the fluid is supplied to the supply inlet 46, both the first 56 and the second 58 channel portions are supplied with the fluid.

The control chamber 48 is in fluid connection with the actuating device 24 by an actuating inlet 60 and a non-actuating inlet 62 of the actuating device 24, each formed on the second side wall 52. The control element 44 and the control chamber 48 are configured to put in fluid connection with the supply inlet 46 either the actuating inlet 60 or the non-actuating inlet 62.

For supplying the fluid either in the actuating inlet 60 or in the non-actuating inlet 62, the actuating inlet 60 faces the first channel portion 56 and the non-actuating inlet 62 faces the second channel portion 58. The non-actuating inlet 62 is thus formed in the second side wall 52 at a greater radial distance from the rotation axis A than the actuating inlet 60. Furthermore, the control element 44 is translatable between a first control position wherein the supply inlet 46 is in fluid connection with the actuating inlet 60 and a second control position wherein the supply inlet 46 is in fluid connection with the non-actuating inlet 62. The second control position of the control element 44 is at a greater radial distance from the rotation axis A than the first control position.

FIG. 2 shows the control element 44 in the first control position, the fluid passage is emphasized with circles. The control element 44 comprises a recess 64 formed through the control element 44. The recess 64 is a groove formed on the outer wall of the control element 44. For allowing the fluid to flow from the first channel portion 56 to the actuating inlet 60, the recess 64 is formed to be at a same radial distance from the rotation axis A as the first channel portion 56 and the actuating inlet 60 so that the fluid can flow from the first channel portion 56 to the actuating inlet 60 via the recess 64. Furthermore, the control element 44 comprises an outer portion 66 formed above the recess 64. The term "outer" means that the outer portion 66 is radially outer with respect to the rotation axis A. In the first control position, the outer portion 66 is disposed between the second channel portion 58 and the non-actuating inlet 62 to prevent the fluid to flow from the second channel portion 58 to the non-actuating inlet 62.

Figure 3:
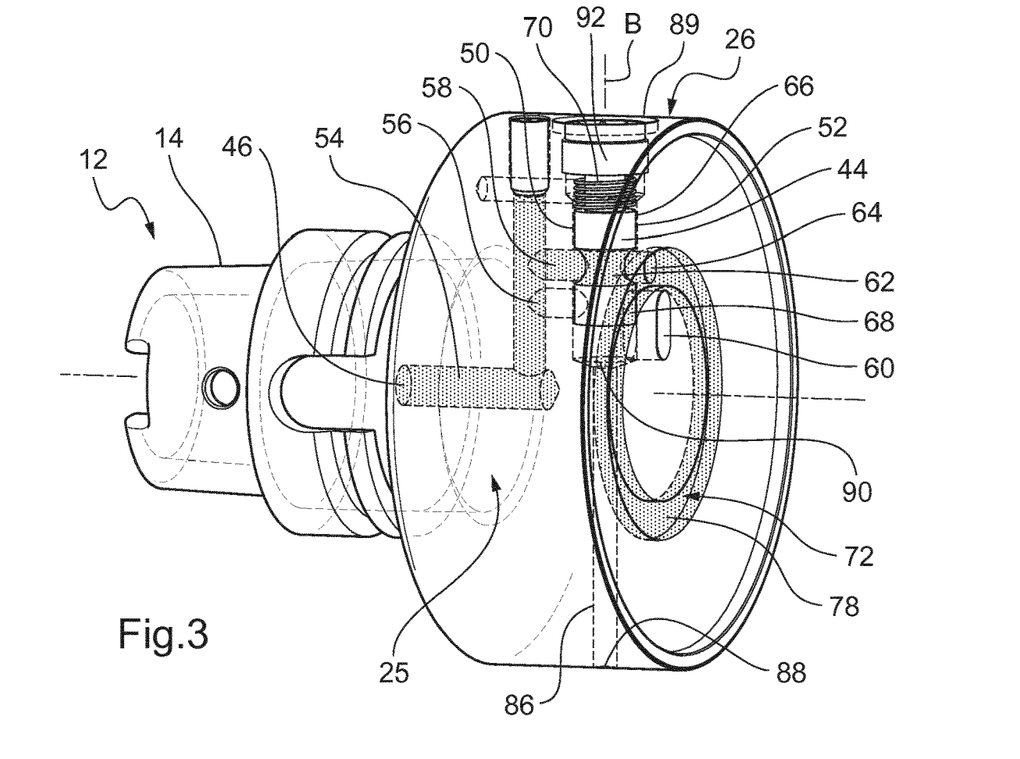

FIG. 3 shows the control element 44 in the second control position, the fluid passage is emphasized with crosses. In the second control position of the control element 44, the recess 64 is disposed at a same radial distance from the rotation axis A as the second channel portion 58 and the non-actuating inlet 62 so that the fluid can flow from the second channel portion 58 to the non-actuating inlet 62 via the recess 64. Furthermore, the control element 44 comprises an inner portion 68 opposite to the outer portion 66 with respect to the recess 64. The term "inner" means that the inner portion 68 is radially inner with respect to the rotation axis A. In other words, the inner portion 68 is at a lower distance from the rotation axis A than the outer portion 66. In the second control position, the inner portion 68 is disposed between the first channel portion 56 and the actuating inlet 60 to prevent the fluid to flow from the first channel portion 56 to the actuating inlet 60.

The control element 44 moves from the first control position to the second control position by the centrifugal force generated by the rotation of the boring bar 10 about the rotation axis A. Particularly, the control element 44 moves from the first control position to the second control position when the centrifugal force generated by the rotation of the boring bar 10 about the rotation axis A reaches a centrifugal force threshold. Since the centrifugal force generated by the rotation of the boring bar 10 about the rotation axis A is function of the rotation speed of the boring bar 10, the control element 44 can be selectively moved in the second control position by controlling the speed of rotation of the boring bar 10.

For closing the second channel portion 58 and the non-actuating inlet 62 or the first channel portion 56 and the actuating inlet 60, the outer 66 and inner 68 portions of the control element 44 are cylindrical with a circular cross-section as the control chamber 48. In this way, the inner 68 and outer 66 portions function as sealing portions. For improving the closure of the second channel portion 58 and the non-actuating inlet 62 or the first channel portion 56 and the actuating inlet 60, the outer 66 and inner 68 portions may also comprise additional sealing members disposed at an outer wall of the outer 66 and inner 68 portions. In this case, each additional sealing member is disposed to face one among the second channel portion 58, the non-actuating inlet 62, the first channel portion 56 and the actuating inlet 60 when the control element 44 is in the first or second control position. The sealing member may be made of rubber.

For controlling the return of the control element 44 from the second control position to the first control position, the fluid connecting circuit 25 further comprises a resilient control return element 70 disposed within the control chamber 48 between the control element 44 and an end wall of the control chamber 48. The resilient control return element 70 is disposed at a greater radial distance from the rotation axis A than the control element 44 for exerting a return force onto the control element 44 to force the control element 44 to remain in the first control position. For ensuring an efficient return of the control element 44, a maximum return force of the resilient control return element 70 is predetermined as being lower than the centrifugal force threshold. The resilient control return element 70 ensures that the control element 44 returns to the first control position when the centrifugal force generated by the rotation of the boring bar 10 about the rotation axis A is below the centrifugal force threshold.

The centrifugal threshold is set depending on working parameters, such as the material and dimensions of the resilient control return element 70 and of the control element 44, the working speed rotation of the boring bar 10, the material of the cutting insert 22 and of the workpiece, the diameter of the boring bar 10. To facilitate managing of the centrifugal threshold, the centrifugal threshold may be set with respect to a boring bar rotation speed threshold. Indeed, the boring bar rotation speed is a parameter that is already controlled during a boring operation. As an example, the boring bar rotation speed threshold may be 1000 rpm for a cutting insert 22 made of boron nitride, a boring bar 10 with a diameter of 80 mm and a boring bar working rotation speed of 3000 rpm. Hence, in this example, when the boring bar 10 is supplied with the fluid from the external fluid supplying circuit, the cutting insert cartridge 20 is placed in the cutting position when the boring bar 10 rotates at a rotation speed of 1000 rpm or more and in the non-cutting position when the boring bar 10 rotates at a rotation speed below 1000 rpm. Furthermore, for increasing the reactivity of the control element 44 to the centrifugal force, the weight of the control element 44 may be set. Indeed, the heavier the control element 44 is, the more reactive the control element 44 is. More preferably, the material of the control element 44 is dense to reduce the dimensions of the control element 44 for a same weight. The control element 44 is for example of tungsten carbide.

Figure 4:
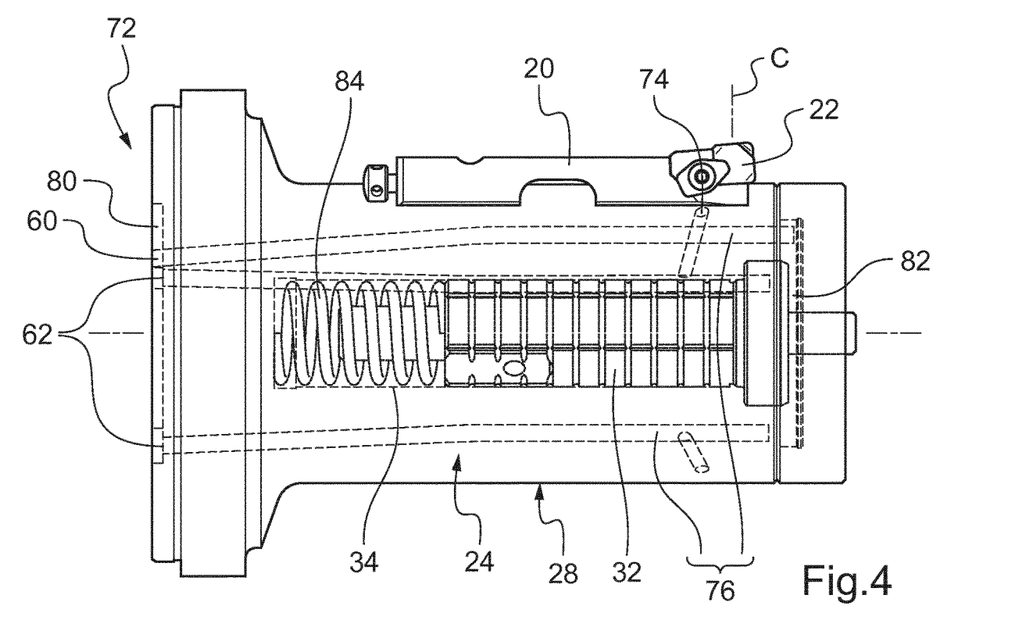
FIG. 4 shows schematically a side view in transparency of the tool body with an actuating device and a cutting insert cartridge.

A shown on FIG. 4, the actuating device 24 further comprises three lubrication orifices 74 formed in each of the receiving portions 18 to face a cutting insert 22 mounted onto a cutting insert cartridge 20 received in a receiving portion 18. The actuating device 24 further comprises three lubrication channels 76, each extending from the non-actuating inlet 62 to one of the lubrication orifices 74 to discharge the fluid on a cutting insert 22 when the non-actuating inlet 62 is supplied with the fluid. In other words, when the boring bar 10 is rotated so that the cutting insert cartridges 20 are in the cutting position, the fluid supplied to the boring bar 10 is used for the lubrication of the cutting inserts 22.

For allowing the non-actuating inlet 62 to supply the three lubrication channels 76, the non-actuating inlet 62 comprises a circular groove 72 extending about the rotation axis A. To facilitate manufacturing of the non-actuating inlet 62, the circular groove 72 is formed at the assembling interface 30 between the tool body 28 and the tool holder. The circular groove 72 comprises a first groove portion 78 formed within the tool holder 26 and a second groove portion 80 formed within the tool body 28. The first groove portion 78 allows the fluid to flow from the control chamber 48 to the second groove portion 80. The second groove portion 80 allows the fluid to flow from first groove portion 78 to the lubrication channels 76.

Moreover, the actuating device 24 further comprises an actuating chamber 34 extending along the rotation axis A in the tool body 28 and a piston 32 able to translate in the actuating chamber 34 along the rotation axis A. The piston 32 may also be called as a "drawbar" for actuating the cutting insert cartridge 20. The piston 32 translates between a first and a second end positions.

The actuating chamber 34 comprises an inlet portion 82 defined between the piston 32 and a first end wall of the actuating chamber 34. The inlet portion 82 is in fluid connection with the actuating inlet 60. When the pressure inside the inlet portion 82 reaches a pressure threshold, the piston 32 is translated from the first end position to the second end position. The actuating device 24 further comprises an actuating resilient return element 84 disposed in the actuating chamber 38 between the piston 32 and a second end wall of the actuating chamber 34, opposite to the first end wall. The actuating resilient return element 84 exerts a return force onto the piston 32 to return the piston 32 from the second end position to the first end position or maintain the piston 32 in the first end position, when the pressure inside the inlet portion 82 is below the pressure threshold. In other words, the actuating resilient return element 84 has a maximum return force predetermined as being lower than the force generated onto the piston 32 by the fluid in the inlet portion 82 when the pressure threshold is reached. Hence, the piston 32 is in the first end position when the actuating inlet 60 is not supplied with the fluid, i.e. either when the only the non-actuating inlet 62 is supplied or when the boring bar is not supplied with the fluid.

As shown on FIG. 4, the tool body 28 extends between a proximal end at which the tool body 28 is assembled to the tool holder 26 and a distal end. The actuating inlet 60 is formed at the proximal end and the inlet portion 82 is formed at the distal end. In this way, when the piston 32 translates from the first end position to the second end position, the piston 32 translates in a direction from the distal end to proximal end of the tool body 28.

Figure 5:
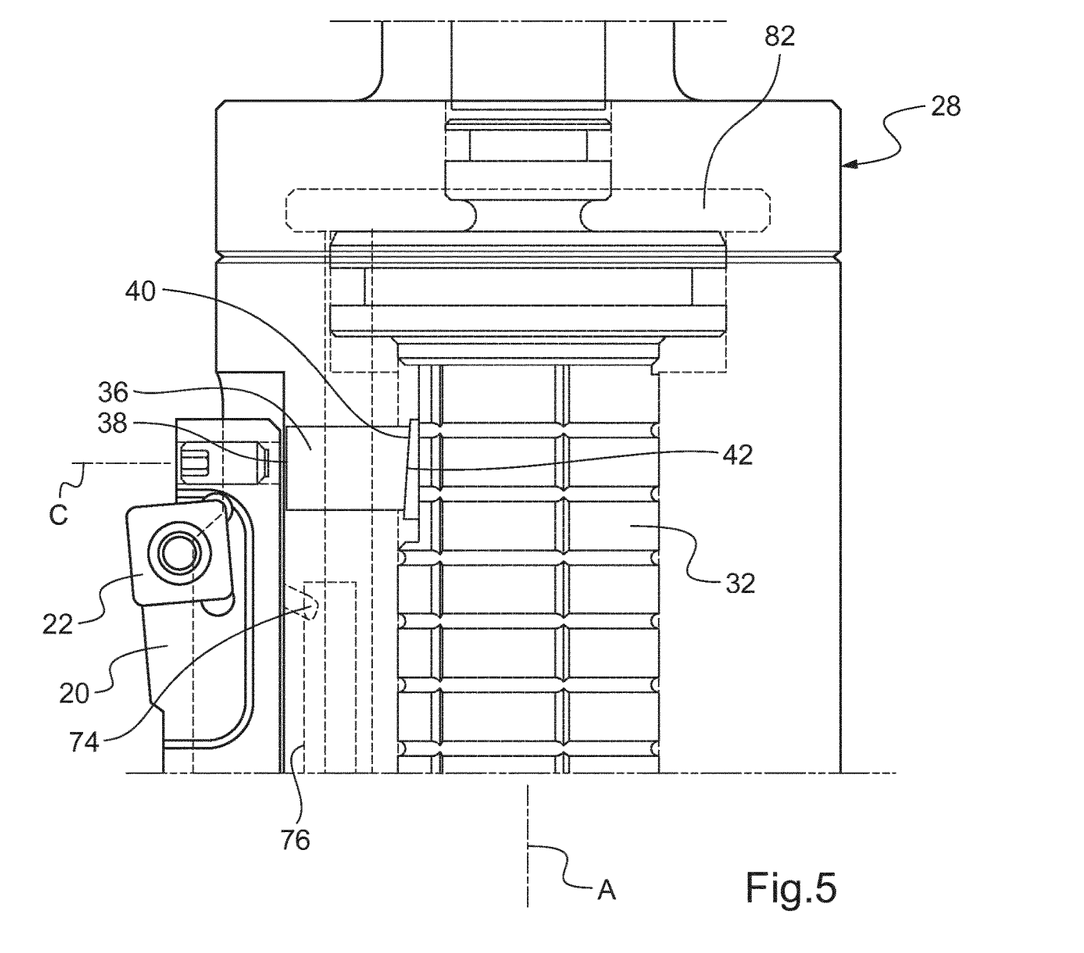
FIG. 5 shows schematically an upper view of the tool body with an interface element between the actuating device and the cutting insert cartridge shown on FIG. 4.

As shown on FIG. 5, the actuating device 24 further comprises an interface element 36 for allowing the cutting insert cartridges 20 to be moved along a actuation axis C perpendicular to the rotation axis A. The interface element 36 is disposed between the piston 32 and the cutting insert cartridges 20 and translatable along the actuation axis C, i.e. transversally to the rotation axis A. The interface element 36 has a first surface 38 for contacting the cutting insert cartridges 20 and a second surface 40 for contacting an actuating surface 42 of the piston 32. The second surface 40 and the actuating surface 42 are complementary biased with respect to the rotation axis A. In other words, the second surface 40 and the actuating surface 42 are angled with respect to the actuation axis C respectively at a first and a second angles so that the first and the second angles forms a supplementary angle. The second surface 40 and the actuating surface 42 allows, when the piston 32 translates along the rotation axis A, the interface element 36 to translate along the actuation axis C, leading the cutting insert cartridges 20 to deform or translate along the actuation axis C. The interface element 36 is for example a wedge with a flat surface, i.e. the first surface 38, and a biased surface, second surface 40, opposite to the flat surface.

For placing the cutting insert cartridge 20 in the cutting position when the piston 32 is in the first end position and in the non-cutting position when the piston 32 is in the second end position, the actuating surface 42 is angled with respect to the rotating axis so that the radial distance between the actuating surface 42 and the rotation axis A increases in the direction from the distal end to the proximal end of the tool body 28. Hence, when the piston 32 translates from the first end position to the second end position, the distance between the interface element 36 and the rotation axis A decreases so that the cutting insert cartridge 20 is placed in the non-cutting position. Conversely, when the piston 32 translates from the second end position to the first end position, the distance between the interface element 36 and the rotation axis A increases so that the cutting insert cartridge 20 is placed in the cutting position.

As a result, the slope of the second surface 40 and the actuating surface 42 from the distal to the proximal end allows the cutting insert cartridge 20 to be in the cutting position when the piston 32 to be in the first end position. Since the piston 32 is in the first end position when the actuating inlet 60 is not supplied with the fluid, the boring bar 10 allows the cutting insert cartridge 20 to be in the cutting position when the boring bar 10 is not supplied with the fluid. Thus, the set-up of the cutting insert cartridge 20 can be performed in the cutting position.

Furthermore, the fluid connection circuit 25 further comprises a leakage channel 86 extending from the control chamber 48 to a leakage outlet 88 formed at an outer wall of the boring bar 10. The leakage channel 86 is in fluid connection with the control chamber 48 at a leakage inlet 90 formed in an end wall of the control chamber, at the opposite end wall contacting the resilient control return element 70. The position of the leakage orifice 90 allows the control element 44 to close the leakage channel 86 when the control element 44 is in the first control position. Conversely, when the control element 44 is in the second control position, the leakage channel 86 is in fluid connection with the actuating inlet 60 for discharging the fluid present in the inlet portion 82 when the piston 32 is translated from the second end position to the first end position.

Furthermore, the fluid connection circuit 25 comprises an additional leakage outlet 89 formed at the outer wall of the boring bar 10, at the opposite of the leakage outlet 88 with respect to the rotation axis A. The additional leakage outlet 89 is in fluid communication with the control chamber 48. The boring bar 10 comprises a screw 92 disposed within the additional leakage outlet 89 to bear the resilient control return element 70. For allowing the control element 44 to reach the second control position even if remaining fluid or air is stuck in the control chamber 48, the screw 92 comprises a through hole (not shown) to enable fluid or air stuck in the control chamber 48 to be discharged outside the control chamber 48. Indeed, remaining fluid or air stuck in the control chamber 48 may prevent the resilient control return element 70 from compressing, and thus block the control element 44 from reaching the second control position.

For facilitating the fluid connection between the actuating inlet 60 and the leakage channel 86, the actuating inlet 60 extends radially to the rotation axis A, e.g. the actuating inlet 60 comprises an oblong hole.

The present disclosure also refers to a method for preparing the boring bar 10. However, the preparing method may be used to prepare any boring bar actuatable by a centrifugal force generated by rotation of the boring bar about a rotation axis for placing a cutting insert cartridge mounted onto the boring bar in a cutting or a non-cutting position.

The preparing method comprises the steps of selecting a centrifugal force threshold and placing the boring bar 10 in a non-actuating position to allow the cutting insert cartridge 20 to be mounted in a cutting position onto the boring bar 10. Then, the cutting insert cartridge 20 is set-up in a cutting position onto the boring bar 10. In the present disclosure, the set-up of a cutting insert cartridge 20 consists in calibrating the position of the cutting insert 22 mounted onto the cutting insert cartridge 20 to predetermine the cutting position of the cutting insert cartridge 20.

The coupling portion 14 of the boring bar 10 is then mounted in the spindle configured to rotate the boring bar about the rotation axis A. The boring bar 10 is supplied with the fluid and the boring is actuated to place the cutting insert cartridge 20 in the non-cutting position by rotating the boring bar 10 about the rotation axis A so that the centrifugal force generated by the rotation of the boring bar 10 about the rotation axis A is below the centrifugal force threshold. The actuation of the boring bar 10 may be carried out by stopping the rotation of the boring bar 10 about the rotation axis A.

The preparing method allows preparing the boring bar 10 to machine a bore. Particularly, once the boring bar 10 is prepared with the above-described method, the cutting insert cartridge 20 may be placed either in the cutting position when the centrifugal force generated by the rotation of the boring bar about the rotation axis reaches a centrifugal force threshold or in the non-cutting position when the centrifugal force generated by the rotation of the boring bar about the rotation axis is below the centrifugal force threshold.

Furthermore, once the boring bar is prepared, the boring bar 10 may be used for a forward or a backward direction machining sequence.

The forward direction machining sequence comprises rotating the spindle to rotate the boring bar 10 about the rotation axis A at a rotation speed generating a centrifugal force equal or higher than the centrifugal force threshold to place the cutting insert cartridge in the cutting position. Then, the boring bar 10 is translating in a forward direction with respect to the workpiece to remove material from the bore.

The backward direction machining sequence comprises translating the boring bar 10 in the forward direction with respect to the workpiece without contact between the workpiece and the cutting inserts 22 mounted onto the cutting insert cartridges 20. Then, the spindle is rotated to rotate the boring bar 10 about the rotation axis A at a rotation speed generating a centrifugal force equal or higher than the centrifugal force threshold to place the cutting insert cartridges 20 in the cutting position. The spindle is rotated to rotate the boring bar about the rotation axis at a rotation speed generating a centrifugal force equal or higher than the centrifugal force threshold to place the cutting insert cartridge in the cutting position. The boring bar is translated in the backward direction with respect to the workpiece to remove material from the bore.

Furthermore, the boring bar 10 may be used to carry out one or more forward direction machining sequences or one or more backward direction machining sequences. The forward and backward direction machining sequences may be also carried out successively for boring operations on a same bore or different bores on a same workpiece.

Even though the present disclosure has been described with precise embodiments above, many variations are possible within the scope of the disclosure.

Alternatively to the three receiving portions 18, the tool body 28 may comprise one, two, four, five or more distributed receiving portions 18 for receiving a cutting insert cartridge 20. Furthermore, the receiving portions 18 may be evenly distributed on the boring bar 10 about the rotation axis A.

Furthermore, the centrifugal force threshold may be in the form of a centrifugal force threshold range corresponding to a transitional state of the boring bar 10 between the first and the second control positions of the control element 44. This transitional state is inherent to the functioning of the boring bar 10. In this case, the centrifugal force threshold comprises a lower and an upper centrifugal force thresholds. The boring bar 10 is configured so that when the centrifugal force generated by the rotation of the boring bar 10 about the rotation axis A is below the lower centrifugal force threshold, the control element 44 is in the first control position. In the same way, the boring bar 10 is also configured so that when the centrifugal force generated by the rotation of the boring bar 10 about the rotation axis A is above the upper centrifugal force threshold, the control element 44 is in the second control position.

The invention claimed is:

1. A boring bar actuatable by a centrifugal force generated by rotation of the boring bar about a rotation axis, the boring bar comprising:

a coupling portion arranged to couple the boring bar to a spindle for rotating the boring bar about the rotation axis, the coupling portion including a supply inlet arranged to connect the boring bar to a fluid supplying circuit;

at least two receiving portions arranged to receive a plurality of cutting insert cartridges distributed on the boring bar about the rotation axis in a cutting position or a non-cutting position;

an actuating device configured to place the cutting insert cartridges received in the at least two receiving portions either in the cutting position or in the non-cutting position, the actuating device having an actuating inlet and a non-actuating inlet, the actuating device being configured to place the cutting insert cartridges in the non-cutting position when the actuating inlet is supplied with a fluid, and in the cutting position when the non-actuating inlet is supplied with a fluid or when neither the actuating or the non-actuating inlet is supplied with a fluid;

a lubrication orifice formed in each of the at least two receiving portions, the non-actuating inlet being in fluid connection with each lubrication orifice to discharge the fluid on a cutting insert mounted on each cutting insert cartridge received in the receiving portions; and a fluid connecting circuit for fluid connection between the supply inlet and either the actuating inlet or the non-actuating inlet, the fluid connecting circuit including a control element movable between a first control position wherein the supply inlet is in fluid connection with the actuating inlet, and a second control position in which the supply inlet is in fluid connection with the non-actuating inlet, wherein the control element is configured to be moved from the first control position to the second control position when the centrifugal force generated by the rotation of the boring bar about the rotation axis reaches a centrifugal force threshold, the control element being configured to be moved from the second control position to the first control position when the centrifugal force generated by the rotation of the boring bar about the rotation axis is below the centrifugal force threshold, wherein the cutting insert cartridges are selectively and automatically placeable in either the non-cutting position or the cutting position depending on the rotation of the boring bar.

2. The boring bar according to claim 1, wherein the fluid connecting circuit includes a control chamber formed within the boring bar, the control chamber being in fluid connection, at a first side wall, with the supply inlet and, at a second side wall opposite to the first side wall, with the actuating inlet and the non-actuating inlet, the control element being disposed within the control chamber.

3. The boring bar according to claim 2, wherein the control chamber extends transversally to the rotation axis of the boring bar, the first and second side walls extending along the control chamber, the actuating and the non-actuating inlets being formed in the second side wall, the non-actuating inlet being formed in the second side wall at a greater radial distance from the rotation axis than the actuating inlet, wherein the second control position of the control element being at a greater radial distance from the rotation axis than the first control position.

4. The boring bar according to claim 3, wherein the fluid connecting circuit includes a resilient control return element disposed within the control chamber between the control element and an end wall of the control chamber, the resilient control return element being at a greater radial distance from the rotation axis than the control element for exerting a return force onto the control element so as to force the control element to remain in the first control position, wherein a maximum return force of the resilient control return element is predetermined as being lower than the centrifugal force threshold.

5. The boring bar according to claim 4, wherein the actuating device includes an actuating chamber formed within the boring bar, a piston configured to translate in the actuating chamber between a first and a second end positions, the piston defining an inlet portion of the chamber in fluid connection with the actuating inlet, the piston being configured to be translated from the first end position to the second end position when the pressure inside the inlet portion reaches a pressure threshold, an actuating resilient return element arranged to translate the piston from the second end position to the first end position when the pressure inside the inlet portion is below the pressure threshold, wherein the actuating device is configured to place the cutting insert cartridges in the non-cutting position when the piston is in the second end position, and in the cutting position when the piston is in the first end position.

6. The boring bar according to claim 5, wherein the actuating chamber extends along the rotation axis of the boring bar, the actuating device including an interface element translatable transversally to the rotation axis, the interface element having a first surface for contacting the cutting insert cartridge and a second surface for contacting an actuating surface of the piston, the second surface and the actuating surface being complementary biased with respect to the rotation axis so that, when the piston is translated along the rotation axis, the interface element and the cutting insert cartridges translate transversally to the rotation axis.

7. The boring bar according to claim 5, wherein the fluid connection circuit includes a leakage channel extending from the control chamber to a leakage outlet formed at an outer wall of the boring bar, the leakage channel being closed by the control element when the control element is in the first control position, the leakage channel being in fluid connection with the actuating inlet when the control element is in the second control position.

8. The boring bar according to claim 1, wherein the non-actuating inlet is in fluid connection with a lubrication orifice formed in the receiving portion to discharge the fluid on a cutting insert mounted onto the cutting insert cartridges.

9. The boring bar according to claim 1, wherein the non-actuating inlet includes a circular groove, the actuating device having a plurality of lubrication channels, each lubrication channel extending from the circular groove to a lubrication orifice formed in the receiving portions.

10. The boring bar according to claim 1, further comprising a tool holder including the coupling portion, the control element, a first portion of the non-actuating inlet and a first portion of the actuating inlet, and a tool body including the receiving portions and a second portion of the non-actuating inlet and a second portion of the actuating inlet, wherein the tool holder and the tool body are configured to be assembled together.

11. A method for preparing a boring bar actuatable by a centrifugal force generated by rotation of the boring bar about a rotation axis for selectively and automatically placing a cutting insert cartridge mounted onto the boring bar in either a cutting or a non-cutting position, the method comprising the steps of:

providing a boring bar according to claim 1;
selecting a centrifugal force threshold;
placing the boring bar in a non-actuating position to allow a cutting insert cartridge to be mounted in a cutting position onto the boring bar;

setting-up a cutting insert cartridge in a cutting position onto the boring bar;

mounting a coupling portion of the boring bar in a spindle configured to rotate the boring bar about the rotation axis;

supplying the boring bar with a fluid; and actuating the boring bar to place the cutting insert cartridge in the non-cutting position by rotating the boring bar about the rotation axis so that the centrifugal force generated by the rotation of the boring bar about the rotation axis is below the centrifugal force threshold, wherein the cutting insert cartridge is selectively and automatically placeable in either the non-cutting position or the cutting position depending on the rotation of the boring bar.

12. The method according to claim 11, further comprising a forward direction machining sequence that includes the steps of:

rotating the spindle to rotate the boring bar about the rotation axis at a rotation speed generating a centrifugal force equal or higher than the centrifugal force threshold to place the cutting insert cartridge in the cutting position;

translating the boring bar in a forward direction with respect to the workpiece to remove material from the bore;

rotating the spindle to rotate the boring bar about the rotation axis at a rotation speed generating a centrifugal force lower than the centrifugal force threshold to place the cutting insert cartridge in the non-cutting position; and translating the boring bar in a backward direction with respect to the workpiece to remove the boring bar from the bore.

13. The method according to claim 12, further comprising a backward direction machining sequence including the steps of:

translating the boring bar in the forward direction with respect to the workpiece without contact between the workpiece and a cutting insert mounted onto the cutting insert cartridge;

rotating the spindle to rotate the boring bar about the rotation axis at a rotation speed generating a centrifugal force equal or higher than the centrifugal force threshold to place the cutting insert cartridge in the cutting position;

translating the boring bar in the backward direction with respect to the workpiece to remove material from the bore; and rotating the spindle to rotate the boring bar about the rotation axis at a rotation speed generating a centrifugal force lower than the centrifugal force threshold to place the cutting insert cartridge in the non-cutting position.

14. The method according to claim 13, comprising at least one sequence of forward direction machining and at least one sequence of backward direction machining.

* * * * *